United States Patent
Navatte et al.

(10) Patent No.: US 11,180,064 B2
(45) Date of Patent: Nov. 23, 2021

(54) ADJUSTMENT MECHANISM FOR VEHICLE SEAT, VEHICLE SEAT COMPRISING SUCH A MECHANISM

(71) Applicant: FAURECIA Sièges d'Automobile, Nanterre (FR)

(72) Inventors: Nicolas Navatte, Condé sur Noireau (FR); Jacek Suchta, Grojec (PL); Grzegorz Lapa, Grojec (PL); Garczynski Radoslaw, Varsovie (PL)

(73) Assignee: FAURECIA Sièges d'Automobile, Nanterre (FR)

( * ) Notice: Subject to any disclaimer, the term of this patent is extended or adjusted under 35 U.S.C. 154(b) by 173 days.

(21) Appl. No.: 16/576,056

(22) Filed: Sep. 19, 2019

(65) Prior Publication Data
US 2020/0101884 A1 Apr. 2, 2020

(30) Foreign Application Priority Data
Oct. 2, 2018 (FR) ...................................... 18 59130

(51) Int. Cl.
| | |
|---|---|
| *B60N 2/16* | (2006.01) |
| *B60N 2/90* | (2018.01) |
| *B60N 2/02* | (2006.01) |
| *B60N 2/06* | (2006.01) |
| *F16H 19/02* | (2006.01) |
| *F16H 57/03* | (2012.01) |
| *F16H 57/02* | (2012.01) |

(52) U.S. Cl.
CPC ........... *B60N 2/919* (2018.02); *B60N 2/0232* (2013.01); *B60N 2/06* (2013.01); *B60N 2/16* (2013.01); *B60N 2/165* (2013.01); *F16H 19/02* (2013.01); *F16H 57/03* (2013.01); *F16H 2057/02026* (2013.01)

(58) Field of Classification Search
CPC ...... B60N 2/919; B60N 2/1645; B60N 2/165; B60N 2002/0236
See application file for complete search history.

(56) References Cited

U.S. PATENT DOCUMENTS

| | | | |
|---|---|---|---|
| 2010/0084872 A1* | 4/2010 | Winiasz | F03D 80/00 290/55 |
| 2013/0333496 A1 | 12/2013 | Boutouil | |
| 2017/0067538 A1* | 3/2017 | Ortiz | B60N 2/933 |
| 2018/0201158 A1 | 7/2018 | Hoffmann | |
| 2018/0216717 A1* | 8/2018 | Thotakuri | B60N 2/0232 |
| 2020/0284330 A1* | 9/2020 | Kajino | F16H 31/002 |

FOREIGN PATENT DOCUMENTS

| | | | | |
|---|---|---|---|---|
| CN | 106114303 B | | 11/2016 | |
| DE | 102011075183 A1 | * | 3/2012 | ............... F16H 1/32 |
| DE | 102013216242 A1 | * | 2/2015 | ............... F16H 1/32 |
| DE | 10201521282363 | | 8/2016 | |
| DE | 102017125554 A1 | * | 5/2019 | ........... F16H 37/041 |
| DE | 102018117576 B3 | * | 5/2019 | ............... F16H 1/16 |
| WO | 2005090826 | | 9/2005 | |

OTHER PUBLICATIONS

French Search Opinion for FR1859130 dated Jun. 19, 2019, BET190309 FR, 8 pages, No English translation available.

* cited by examiner

*Primary Examiner* — Timothy J Brindley
(74) *Attorney, Agent, or Firm* — Barnes & Thornburg LLP

(57) ABSTRACT

An adjustment mechanism for a vehicle seat comprising a transmission housing and a slider comprising a first longitudinal guide member. The slider engaging with the transmission housing by means of the first longitudinal guide member.

7 Claims, 4 Drawing Sheets

ADJUSTMENT MECHANISM FOR VEHICLE SEAT, VEHICLE SEAT COMPRISING SUCH A MECHANISM

PRIORITY CLAIM

This application claims priority to French Application No. FR 18 59130, filed Oct. 2, 2018, which is expressly incorporated by reference herein.

BACKGROUND

The present disclosure relates to adjusting mechanism, and particularly to adjusting mechanism for vehicle seats. More particularly, the present disclosure relates to vehicles seats comprising an adjusting mechanism.

SUMMARY

According to the present disclosure, a vehicle seat includes an adjustment mechanism. The adjustment mechanism comprises a transmission housing and a slider. The slider engages the transmission housing by means of a first guide member.

In illustrative embodiments, the adjustment mechanism further comprises at least one reinforcing member, the reinforcing member being configured to reinforce the strength of the transmission housing when force is exerted by the first longitudinal guide member on the transmission housing.

In illustrative embodiments, the adjustment mechanism is particularly simple, inexpensive to implement, and strength is increased, particularly the strength of the transmission housing in case of impact.

In illustrative embodiments, the adjustment mechanism for a vehicle seat can withstand significant force applied to the seat.

In illustrative embodiments, the slider comprises a body and the first longitudinal guide member comprises extensions extending from the body along a longitudinal axis, the reinforcing member being arranged, at least partially, between two extensions of the first longitudinal guide member.

In illustrative embodiments, the slider comprises a body, and the first longitudinal guide member comprises at least two extensions forming a U-shape with the body, the reinforcing member being arranged, at least partially, between the two extensions of the first longitudinal guide member.

In illustrative embodiments, the adjustment mechanism comprises an eccentric member driven by a driving member, an eccentric cogwheel rotatably mounted on the eccentric member, and an output member comprising an inner ring gear which engages with the eccentric cogwheel by partial engagement of the teeth, the slider comprising a second longitudinal guide member, the slider engaging with the eccentric cogwheel by means of the second longitudinal guide member.

In illustrative embodiments, the transmission housing comprises a base body and an end plate forming a cover; the slider is made of metal while the base body of the transmission housing is made of plastic; the reinforcing member is a non-threaded rod inserted into the base body of the transmission housing; the end plate is assembled to the base body by means of screws, the screws acting as reinforcing members; the reinforcing member is crimped or welded to the end plate of the transmission housing; the reinforcing member is overmolded in the base body of the transmission housing; the first longitudinal guide member can exert a torque on the base body of the transmission housing that is at least equal to 300 Nm, preferably at least equal to 400 Nm, more preferably at least equal to 440 Nm, without damaging the base body.

In illustrative embodiments, the present disclosure also relates to a vehicle seat comprising an adjustment mechanism as described above.

In illustrative embodiments, the seat may possibly comprise a seating portion that is height-adjustable by a raising mechanism, the adjustment mechanism controlling the raising mechanism.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar elements.

Figure 1:
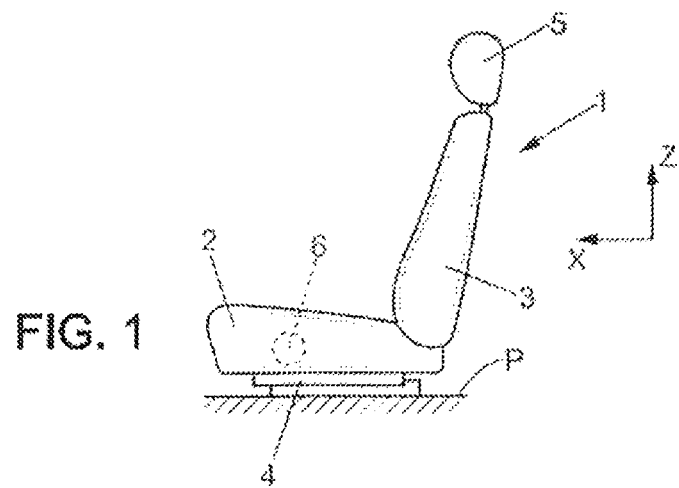
FIG. 1 is a schematic view of a vehicle seat in which the seating portion is height-adjustable by means of an adjustment mechanism according to the present disclosure.

FIG. 1 shows a seat 1 of a motor vehicle, which comprises a backrest 3 carried by a seating portion 2 mounted on a floor P of the vehicle, for example by means of longitudinal rails 4. A headrest 5 possibly sits on top of the backrest 3.

The seating portion 2 is connected to the rails 4 by means of a raising mechanism which makes it possible to adjust the height of the seating portion 2. This raising mechanism is controlled by an adjustment mechanism 6 driven by actuating means such as an electric motor 7 controlled remotely by the user and driving a driving member 8 to rotate about a horizontal longitudinal axis of rotation X.

As shown in FIGS. 2 to 6, the adjustment mechanism 6 comprises a transmission housing 9 forming a fixed support relative to the seating portion 2 of the seat 1. This transmission housing 9 comprises a base body 10 as well as an end plate 11 forming a cover.

The assembly of the end plate 11 on the base body 10 can be done for example by means of screws 12, by welding, crimping, a combination of these techniques, or any other suitable assembly technique.

As illustrated in the figures, the end plate 11 is more particularly assembled on the base body 10 in a fixed manner by means of four screws 12.

Referring to FIGS. 2 to 6, the adjustment mechanism 6 comprises the drive member 8 rotated by the electric motor 7 and provided with a helical screw.

This drive member 8 engages with a control member 13 by means of an external ring gear 14 of the control member 13 and rotates the control member 13 on a connecting shaft 26, the connecting shaft 26 extending along an axis of rotation Y which is also the axis of rotation of the control member 13. The axis of rotation Y may be perpendicular to the longitudinal axis X.

The control member 13 has, in proximity to its axis of rotation, an eccentric member 15 projecting along the axis of rotation Y and on which an eccentric cogwheel 16 is rotatably mounted.

The eccentric cogwheel 16 is mounted on the eccentric member 15 so as to be freely pivotable.

Figure 5:
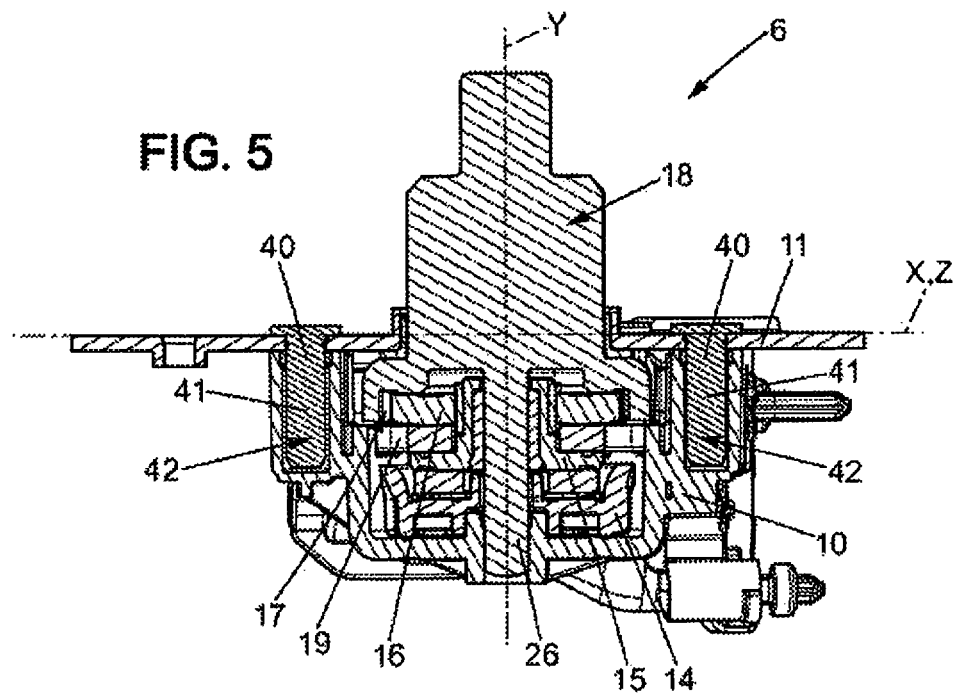
FIG. 5 is a sectional view of the mechanism of FIG. 2 along section plane V-V.

The eccentric cogwheel 16 is received inside an inner ring gear 17, shown in FIG. 5, of an output member 18 mounted on or comprising the connecting shaft 26.

The eccentric cogwheel 16 has a circumference and a number of teeth smaller than that of the inner ring gear 17 so as to engage therein in order to create a reduction ratio in a manner which will now be described.

The eccentric cogwheel 16 is rotationally locked relative to the axis of rotation Y by means of a slider 19.

Figure 6:
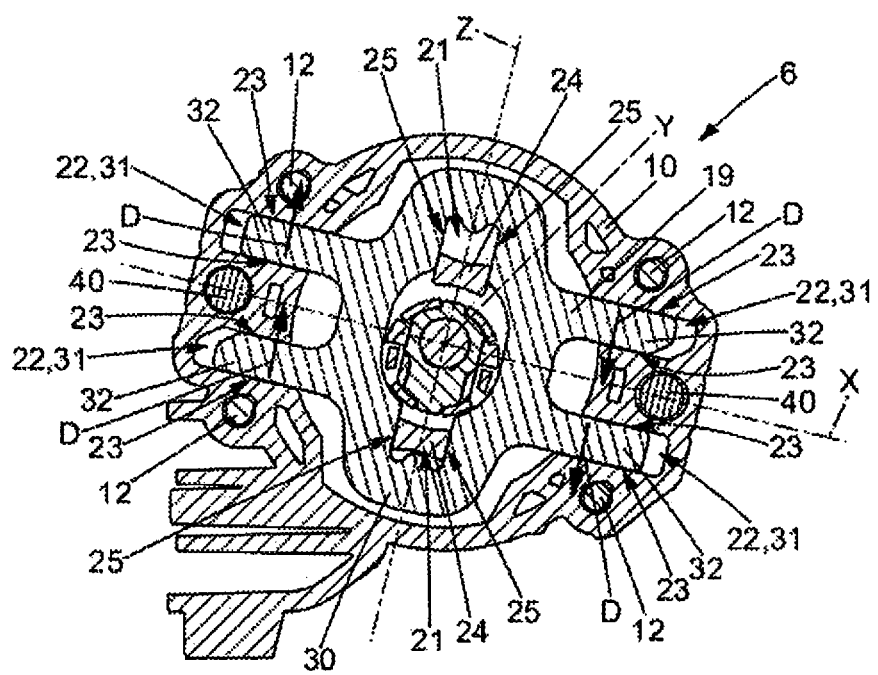
FIG. 6 is a sectional view of the mechanism of FIG. 2 along section plane VI-VI.

To this end, the slider 19 comprises a first longitudinal guide member 20 and a second longitudinal guide member 21 which are illustrated in FIG. 6.

The first longitudinal guide member 20 is adapted to engage with a first counter-member 22 of the base body 10 of the transmission housing 9.

For this purpose, the first longitudinal guide member 20 comprises first guide surfaces 23 adapted to slide in or against the first counter-member 22.

The first guide surfaces 23 are adapted so that the slider 19 can only travel in a line with respect to the base body 10 of the transmission housing 9.

Thus, the first guide surfaces 23 can for example lock the slider 19 in translation relative to the transmission housing 9, along a vertical axis Z. The vertical axis Z is perpendicular to the longitudinal axis X.

The slider 19 can also be locked in rotation about the axis of rotation Y with respect to the transmission housing 9.

The slider 19 can, however, be free to slide relative to the transmission housing 9 along the longitudinal axis X.

The engagement of the first longitudinal guide member 20 with the first counter-member 22 therefore locks the slider 19 in translation along the vertical axis Z and in rotation about the axis of rotation Y with respect to the transmission housing 9, while leaving it free to slide along the longitudinal axis X.

The second longitudinal guide member 21 is adapted to engage with a second counter-member 24 of the eccentric cogwheel 16.

For this purpose, the second longitudinal guide member 21 has second guide surfaces 25 adapted to slide against the second counter-member 24.

Thus, the eccentric cogwheel 16 can only travel in a line with respect to the slider 19.

The second guide surfaces 25 can, for example, lock the eccentric gear 16 in translation with respect to the slider 19, along the longitudinal axis X.

The eccentric cogwheel 16 can also be locked in rotation about the axis of rotation Y with respect to the slider 19.

The eccentric cogwheel 16 can, however, be free to slide relative to the slider 19 along the vertical axis Z.

The engagement of the second longitudinal guide member 21 with the second counter-member 24 therefore locks the eccentric cogwheel 16 in translation along the longitudinal axis X and in rotation about the axis of rotation Y with respect to the slider 19, while leaving it free to slide along the vertical axis Z.

In this manner, the eccentric cogwheel 16 can only move with respect to the transmission housing 9 in circular translation in a plane X-Z, and in particular is locked in rotation about the axis of rotation Y with respect to the transmission housing 9 due to the engagement of the first and second longitudinal guide members 20, 21 of the slider 19 with the first and second counter-members 22, 24 of the base body 10 of the transmission housing 9 and of the eccentric cogwheel 16.

A complete circle of the eccentric cogwheel 16 within the inner ring gear 17 angularly shifts the output member 18 relative to the transmission housing 9 by the difference in the number of teeth between the eccentric cogwheel 16 and the inner ring gear, which generates the reduction ratio.

In one embodiment illustrated in FIGS. 2 to 6, the first longitudinal guide member 20 may consist of several extensions of rectangular cross-section 32, for example two or four extensions 32 projecting along the longitudinal axis X from a body 30 of the slider 19.

In FIG. 6, the extensions 32 extend in pairs on each side of the body 30 of the slider 19. The extensions 32 thus form a U-shape with the body 30, on each side of the body 30.

The two extensions 32 are symmetrical to one another with respect to the longitudinal axis X.

The sides of the extensions 32 constitute the first guide surfaces 23.

The first counter-member 22 may then comprise longitudinal grooves 31 formed in the transmission housing 9, for example in the base body 10, and accommodating the extensions 32.

The second longitudinal guide member 21 may consist of a rectilinear opening made in the slider 19 and whose sides constitute the second guide surfaces 25. The second counter-member 24 may then comprise projecting fingers of square cross-section protruding from the eccentric cogwheel 16 to fit into the rectilinear opening.

In variants, other shapes may be considered for the first and second longitudinal guide members 20, 21 and the first and second counter-members 22, 24.

The control member 13, the eccentric cogwheel 16, the slider 19, and/or the end plate 11 of the transmission housing 9 may be made of metal.

The metal may be heat treated. The metal, possibly heat-treated, may be any suitable metal and any suitable heat treatment. The metal may for example be steel.

The heat treatment makes it possible to obtain a hardness sufficient to withstand the wear resulting from the interaction between the different members of the adjustment mechanism 6 over a desired service life.

In the event of a major impact, for example during a crash of the vehicle, a force, in particular a significant torque, is likely to be exerted and transmitted from the seat 1, and in particular progressively, on the output member 18, the eccentric cogwheel 16, the slider 19, the base body 10 of the transmission housing 9, and the end plate 11 of the transmission housing 9.

As the base body 10 of the transmission housing 9 is made of plastic, it is unlikely to resist, in other words is likely to deform plastically, when a significant force is applied by the first longitudinal guide member 20 of the slider 19 on the transmission housing 9.

According to the present disclosure, the adjustment mechanism 6 further comprises at least one reinforcing member 40.

As illustrated more particularly in FIGS. 2 to 6, the adjustment mechanism 6 comprises a plurality of reinforcing members 40, and more precisely at least two reinforcing members 40.

In this manner, when a significant impact occurs, for example during a crash of the vehicle, and a significant force is applied by the first longitudinal guide member 20 on the transmission housing 9, the reinforcing members 40 make it possible to prevent the deformation of the transmission housing 9.

The value of the maximum torque that can be applied by the slider 19 on the base body 10 of the transmission housing 9 is thus at least equal to 300 Nm (Newton meter), preferably at least equal to 400 Nm, or more preferably at least equal to 440 Nm, without the transmission housing 9 being damaged.

A reinforcing member 40 comprises a body 41 extending in the direction of the axis of rotation Y.

Thus, the reinforcing members 40 extend into the base body 10 of the transmission housing 9, in particular into openings 42 illustrated in FIG. 5.

The reinforcing members 40 are more particularly made of metal, possibly heat-treated, for example steel.

According to the embodiment illustrated in FIGS. 2 to 6, the reinforcing members 40 may be fixed to the end plate 11 of the transmission housing 9 by crimping.

According to another embodiment (not shown), the reinforcing members 40 may be fixed to the end plate 11 of the transmission housing 9 by welding, or by any other assembly technique.

In one example, the reinforcing members 40 are pins or unthreaded rods, as illustrated in the figures. However, alternatively, the reinforcing members 40 may be fixed to the base body 10 of the transmission housing 9, in particular by screwing.

The screws 12 described above can thus also act as reinforcing members, in which case the adjustment mechanism 6 of FIGS. 2 to 6 comprises six reinforcing members 40.

As illustrated in FIG. 6, the screws 12 may respectively be arranged by the outer side of the extensions 32. Outer side is the side opposite to the inner side located relatively closer to the longitudinal axis X.

Reinforcing members 40 may be arranged at least partially between two extensions 32, by their inner side. In particular, depending on the translational position of the slider 19 along the longitudinal axis X, the reinforcing members 40 may either be located completely between two extensions 32, or located partially between two extensions 32.

Thus, a torque exerted for example in the clockwise direction by the slider 19 about the axis of rotation Y on the base body 10 is illustrated in FIG. 6 by the arrows D.

When such a torque is exerted, the reinforcing members 40, possibly with the screws 12 also acting as reinforcing members, increase the resistance of the base body 10 in order to minimize any deformation or deterioration of the latter.

In particular, each extension 32 of the first longitudinal guide member 20 is capable of coming into contact (aside from the thickness of the plastic material of the base body 10) with a reinforcing member 40 positioned nearby, regardless of the direction of rotation of the torque exerted.

According to another embodiment (not shown), the reinforcing members 40 may be overmolded in the base body 10 of the transmission housing 9. The reinforcing members 40 are then advantageously, in particular completely, covered by the material, in particular plastic, of the base body 10.

According to one particular embodiment, a reinforcing member 40 may be overmolded, in the form of a curved rod or wire in the base body 10.

A method for assembling the adjustment mechanism 6 of FIGS. 2 to 6 is described below.

In a first step, the reinforcing members 40 are fixed to the end plate 11 of the transmission housing 9.

In a second step, the reinforcing members 40 are inserted into the openings 42 of the base body 10 of the transmission housing 9. When the reinforcing members 40 are unthreaded rods, they ensure easy translational insertion into the base body 10 and ease of assembly, while allowing a satisfactory positioning of the end plate 11.

Figure 2:
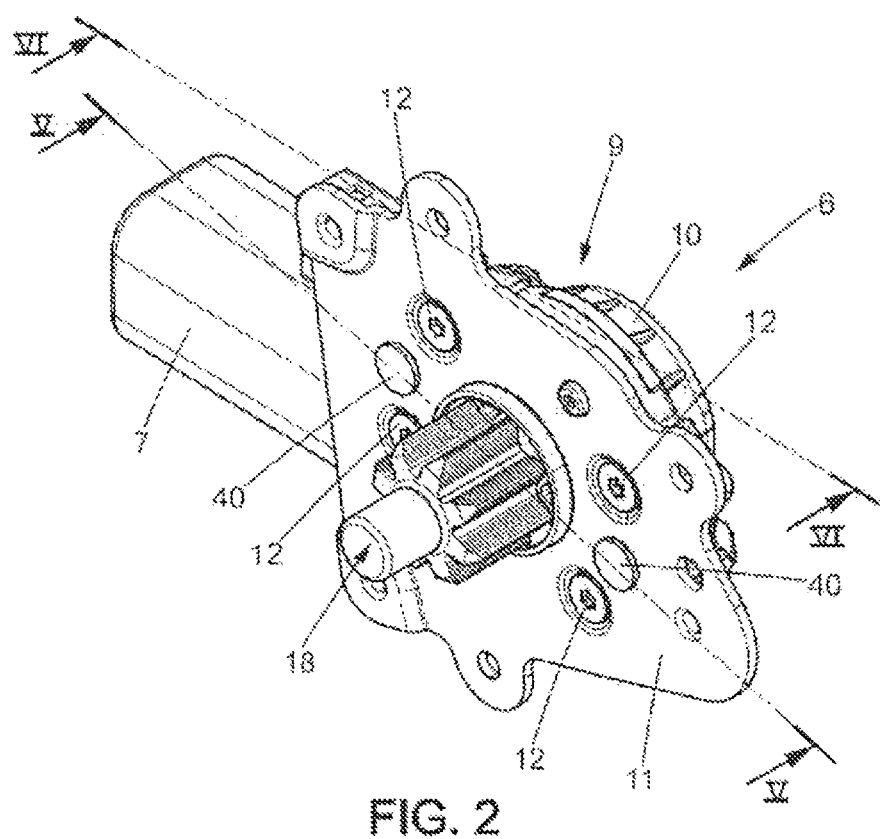
FIG. 2 is a perspective view of the adjustment mechanism of the seat of FIG. 1.
Figure 3:
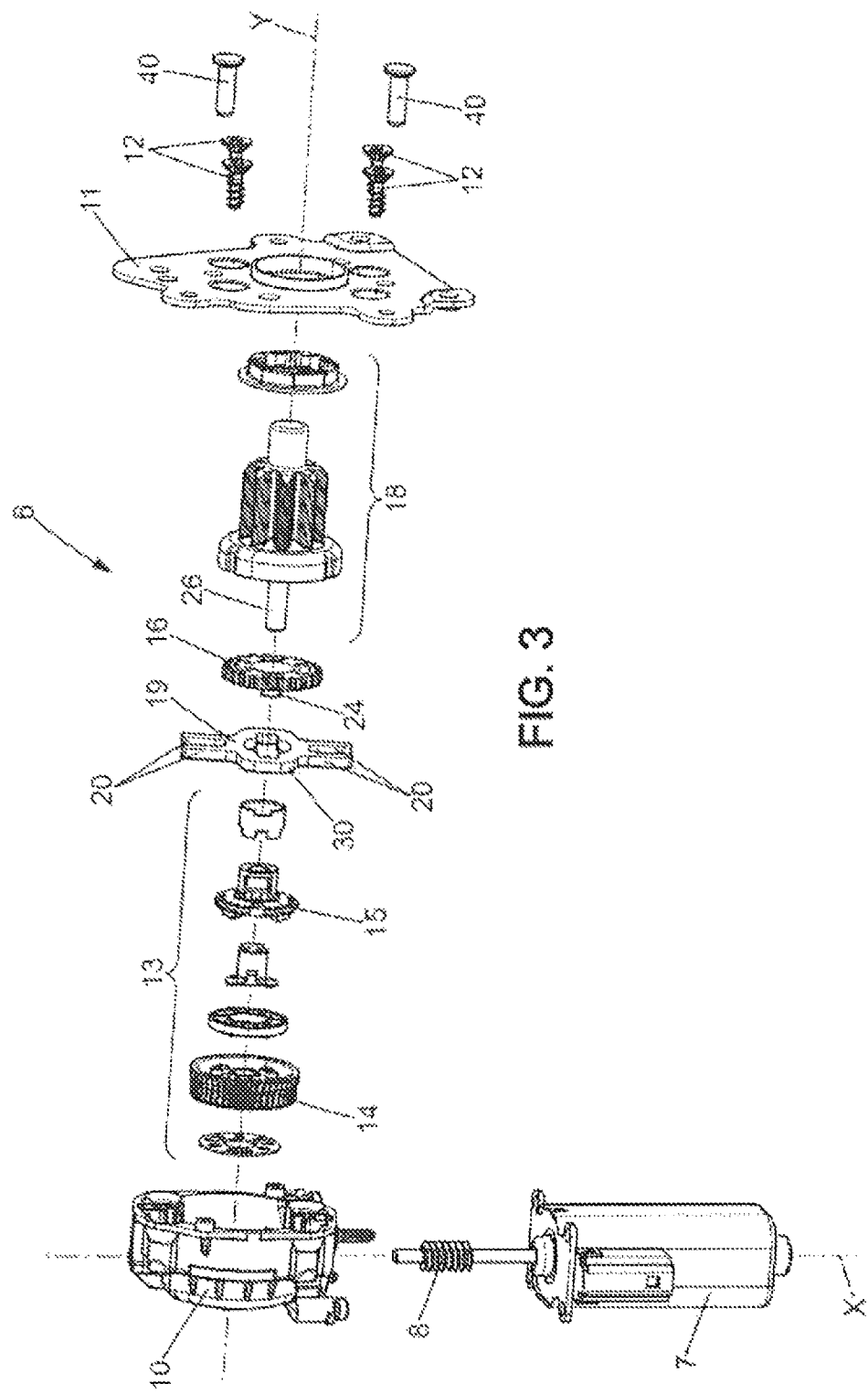
FIG. 3 is an exploded perspective view of the adjustment mechanism of FIG. 2.
Figure 4:
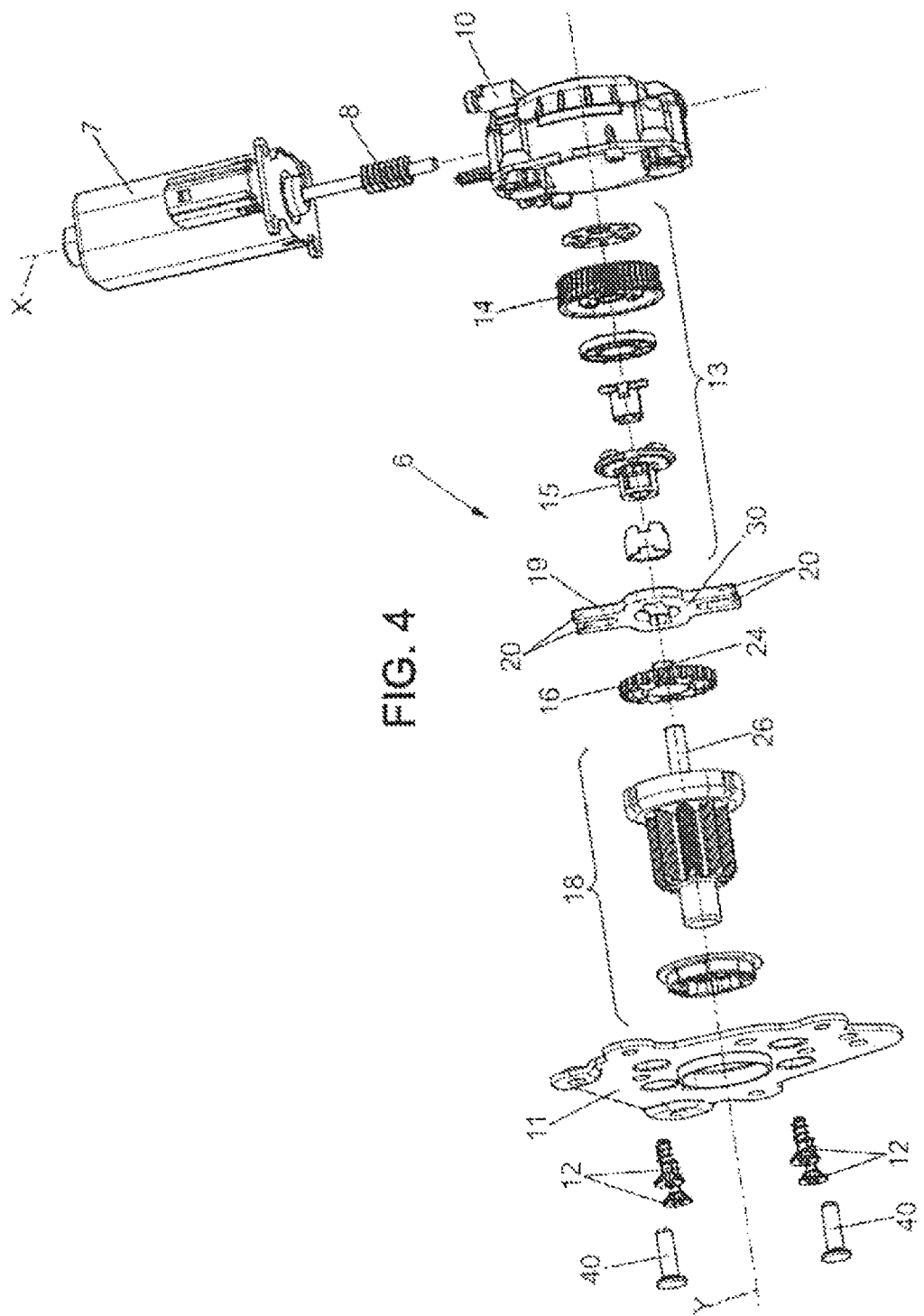
FIG. 4 is another exploded perspective view of the adjustment mechanism of FIG. 2.

In a third step, the screws 12 are arranged to secure the base body 10 to the end plate 11, in a manner that obtains the adjustment mechanism 6 as illustrated in FIG. 2.

This method is particularly simple to implement and does not require any additional part to be placed inside the adjustment mechanism 6.

In particular, although the adjustment mechanism 6 has been described in the context of a raising mechanism between the backrest 3 and the seating portion 2, it can be arranged between any part of the seat 1, in particular to allow hinging the seat 1 according to various configurations.

In addition, although the present disclosure has been described in connection with a base body 10 of the transmission housing 9 being made of plastic, it is understood that it may also be made of another material, the reinforcing members 40 retaining their interest for reinforcing the strength of the adjustment mechanism 6.

The present disclosure relates to an adjustment mechanism for a vehicle seat, comprising a transmission housing, and a slider comprising a first longitudinal guide member, the slider engaging with the transmission housing by means of the first longitudinal guide member. Reference is hereby made to International (PCT) Application No. WO2005090826 for disclosure relating to an adjustment mechanism, which application is hereby incorporated in its entirety herein.

In one example, an adjustment mechanism in which the transmission housing is made of plastic while the slider is made of metal may have undesirable consequences. Thus, when a large force is transmitted from the slider to the transmission housing, for example in the event of a violent impact on the vehicle, the plastic-metal contact may cause a rupture in the transmission housing. This may be addressed by adding a metal fastening flange, adapted to engage with the slider and to be fixed to the plastic transmission housing. However, this has the disadvantage of requiring an additional part that can be difficult to arrange inside the adjustment mechanism. An adjustment mechanism of the present disclosure overcomes these disadvantages.

The invention claimed is:

1. An adjustment mechanism for a vehicle seat, the adjustment mechanism comprising
   a transmission housing, comprising a base body and an end plate forming a cover, and
   a slider comprising a first longitudinal guide member, the slider engaging with the transmission housing by means of the first longitudinal guide member,
   wherein the adjustment mechanism further comprises at least one reinforcing member, the reinforcing member being configured to reinforce the strength of the transmission housing when force is exerted by the first longitudinal guide member on the transmission housing, wherein the slider comprises a body and the first longitudinal guide member comprises extensions extending from the body along a longitudinal axis, the reinforcing member being arranged, at least partially, between two extensions of the first longitudinal guide member, wherein the slider is made of metal while the base body of the transmission housing is made of plastic, wherein the reinforcing member is a non-threaded rod inserted into the base body of the transmission housing, and wherein the reinforcing member is overmolded in the base body of the transmission housing.

2. The adjustment mechanism of claim 1, wherein the slider comprises a body and the first longitudinal guide member comprises at least two extensions forming a U-shape with the body, the reinforcing member being arranged, at least partially, between the two extensions of the first longitudinal guide member.

3. The adjustment mechanism of claim 2, further comprising an eccentric member driven by a driving member, an eccentric cogwheel rotatably mounted on the eccentric member, and an output member comprising an inner ring gear which engages with the eccentric cogwheel by partial engagement of the teeth, the slider comprising a second longitudinal guide member, the slider engaging with the eccentric cogwheel by means of the second longitudinal guide member.

4. The adjustment mechanism of claim 1, further comprising an eccentric member driven by a driving member, an eccentric cogwheel rotatably mounted on the eccentric member, and an output member comprising an inner ring gear which engages with the eccentric cogwheel by partial engagement of the teeth, the slider comprising a second longitudinal guide member, the slider engaging with the eccentric cogwheel by means of the second longitudinal guide member.

5. The adjustment mechanism of claim 1, wherein the first longitudinal guide member can exert a torque on the base body of the transmission housing that is at least equal to 300 Nm, preferably at least equal to 400 Nm, more particularly at least equal to 440 Nm, without damaging the base body.

6. A vehicle seat comprising the adjustment mechanism of claim 1.

7. The vehicle seat of claim 6, further comprising a seating portion that is height-adjustable by a raising mechanism, the adjustment mechanism controlling the raising mechanism.

* * * * *